April 4, 1944.　　　C. E. EVERETT　　　2,346,103
GREEN HAY HARVESTER
Filed Aug. 27, 1941　　　7 Sheets-Sheet 2

INVENTOR.
CHARLES E. EVERETT
BY
ATTORNEY

April 4, 1944.   C. E. EVERETT   2,346,103
GREEN HAY HARVESTER
Filed Aug. 27, 1941   7 Sheets-Sheet 3

INVENTOR.
CHARLES E. EVERETT
BY
ATTORNEY

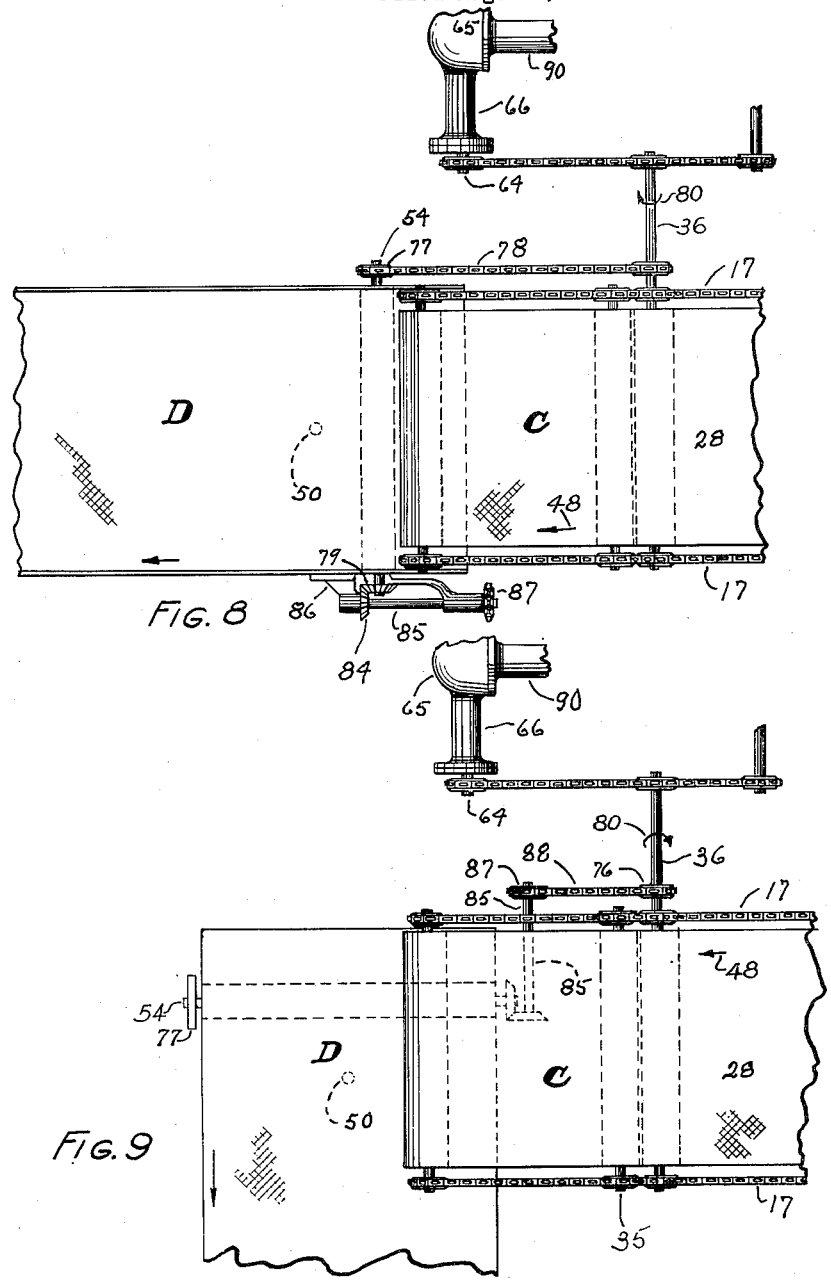

Patented Apr. 4, 1944

2,346,103

UNITED STATES PATENT OFFICE 2,346,103

GREEN HAY HARVESTER

Charles E. Everett, Racine, Wis., assignor to The Massey-Harris Company, Racine, Wis., a company of Maryland Application August 27, 1941, Serial No. 408,407

5 Claims. (Cl. 56—16)

The present invention relates to what is commonly termed green hay harvesters and has for its principal object providing a general purpose machine which will cut and chop or shred the hay and deliver the product to the hauling means or cut and deliver the hay in its natural state to a wagon or in windrows.

An object of the present invention is to provide means whereby the final elevating device may be adjusted to extend transversely or rearwardly and having means whereby the free end of this elevator is adequately supported at a desired distance from the ground.

One of the objects of the present invention is to provide convenient means for making power connections to the final elevating device when delivering the hay transversely or rearwardly.

An object of my invention is to provide a cutting and elevating platform which can be conveniently adjusted for any desired length of stubble similar to the cutter bars of mowers or combine harvesters.

An important object of the present invention is to provide a chopping or shredding cylinder having convenient means for adjustment either as to the cylinder knives and bar contact or as to distances between these members when it is desired to shred or not to shred the hay.

A further object of my invention is to provide a simple and efficient transverse conveyor suitable for delivering the hay to the final elevating device.

An important object of the present invention is to provide a supporting means for the cylinder whereby it may be easily adjusted for its cylinder blade contact with its bar or to any desired distance away from the bar.

Generally stated, an object of the present invention is to cut and deliver the hay either chopped, shredded or in its natural state to the hauling device or to deliver it in its natural state in windrows and the device being suitable for picking up the windrows and delivering the hay either chopped, shredded, or in its natural state to the hauling device.

During the last few years, many methods have been tried with more or less success by the universities and manufacturers of hay machinery. The present device is adapted to accomplish any one of the approved methods and its structure is such that the farmer may, in a very few minutes, change the device so it will operate in any one of the approved ways.

To these and other useful ends, my device consists of parts, combinations of parts, or their equivalents, and mode of operation, as hereinafter described and claimed and shown in the accompanying drawings in which:

Fig. 8 is a top fractional semi-diagrammatic drawing illustrating the final elevator in a transverse position and also illustrating its operating connection to the transverse elevator driving shaft.

Fig. 9 is a view similar to Figure 8 except with the final elevator extending rearwardly illustrating its operating connection to the transverse elevator driving shaft.

Figure 1:
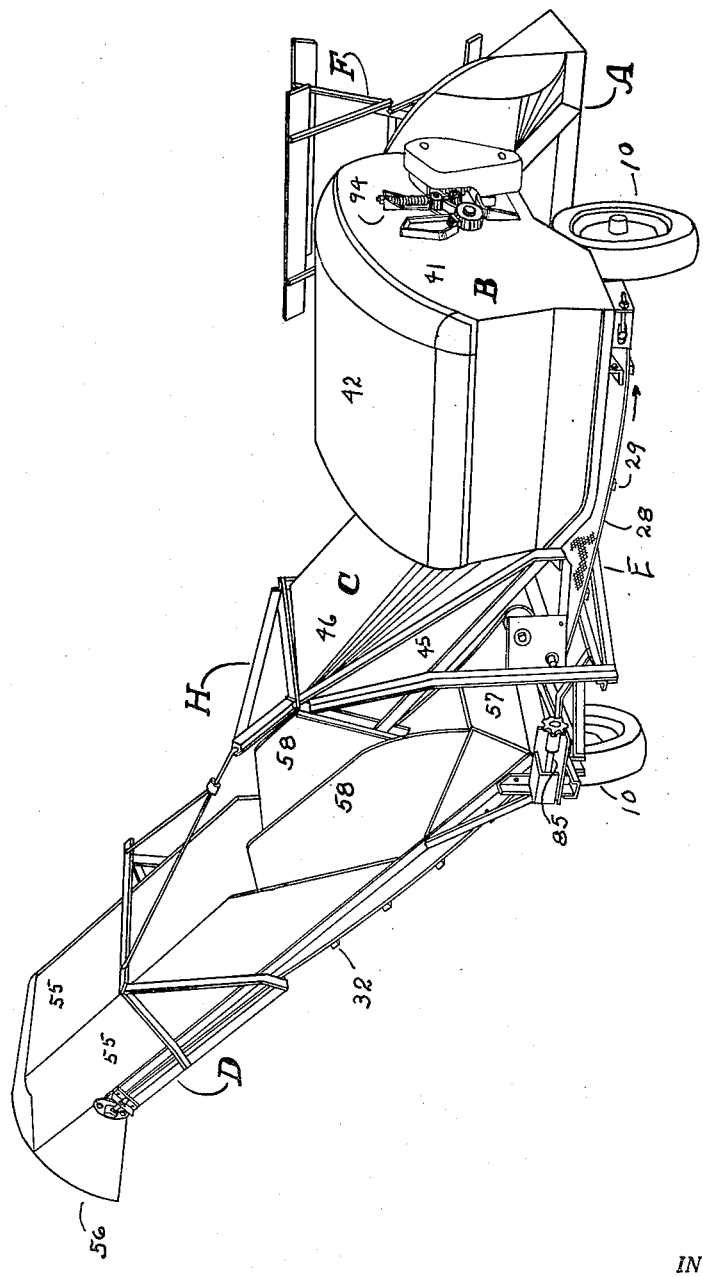
Fig. 1 is a three-quarter rear perspective view of my device with the final elevator set transverse to the direction of travel.

As thus illustrated, my device is provided with a cutting and elevating platform which in its entirety is designated by reference character A. The main portion of the device which includes the feed rollers, chopping cylinder and housing is designated in its entirety by reference character B. The transverse conveyor in its entirety is designated by reference character C and the final elevator is designated in its entirety by reference character D. The various members are mounted on a frame which in its entirety is designated by reference character E (see Figure 3).

Figure 3:
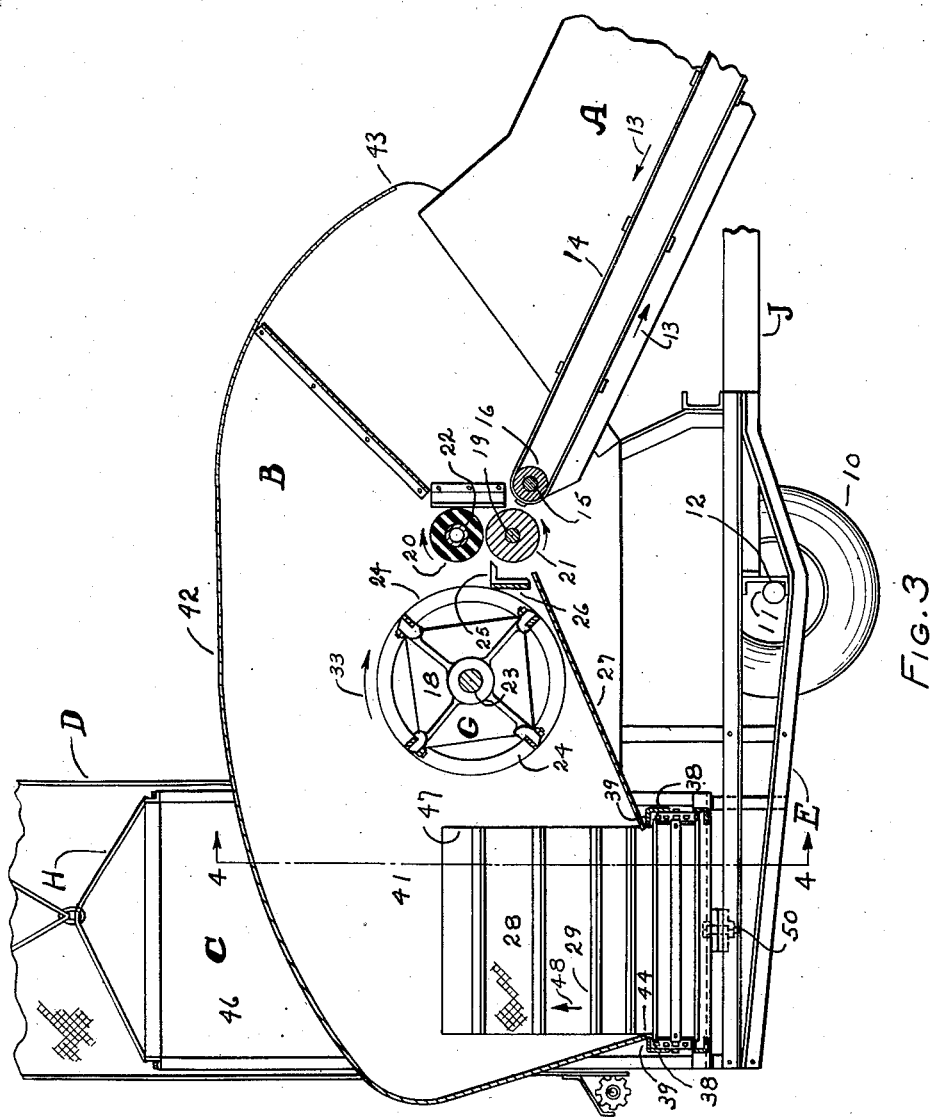
Fig. 3 is a fractional longitudinal section of the device taken on line 3—3 of Figure 4.
Figure 7:
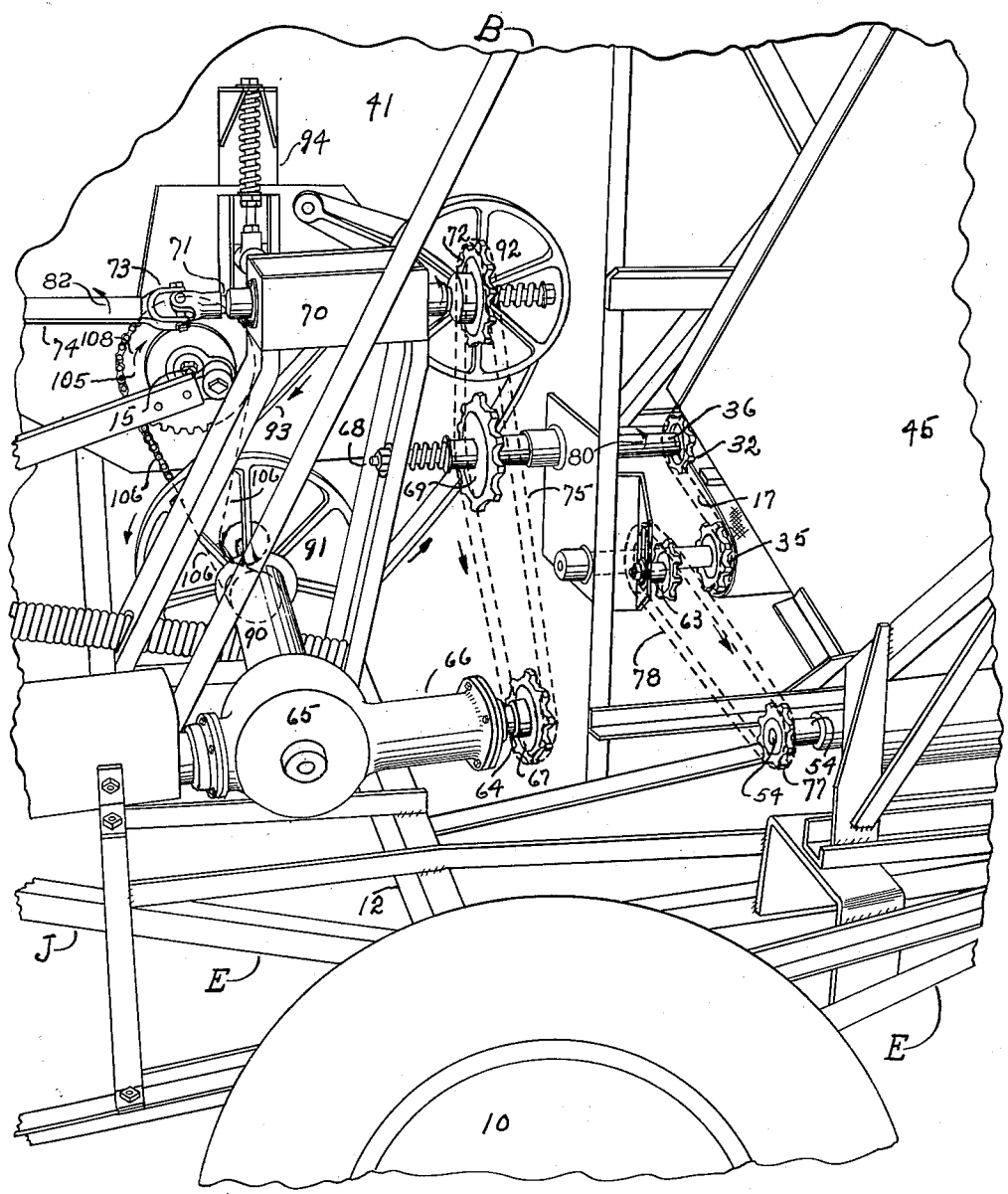
Fig. 7 is a perspective fractional view of the device taken from a point somewhat in front of the final elevator.

Frame E is carried by supporting wheels 10—10, the wheels being rotatably mounted on stub axles 11—11 (see Figure 4), the axles being suitably secured to a transverse member 12 of frame E (see Figures 3 and 7). The frame is provided with a forwardly extending hitch member a fraction being shown and designated by reference character J. This member is provided with means (not shown) for suitable attachment to the draw bar of a tractor having a power take-off as is customary in devices of the kind.

Platform A is similar to the platform of a combine harvester having the usual cutter bar and an endless canvas elevator. Member A is too well known to require further description except to state that it is pivoted to member B preferably concentric with shaft 15 (see Figure 3) which carries a driving roller 16 for elevator 14. The usual lever connection (not shown) is made between members J and A so the front end of member A may be conveniently raised and lowered by the operator preferably from his seat on the tractor.

Member A is provided with the usual reel which in its entirety is designated by reference character F and is adapted to move the hay toward and on elevator 14 as it is being cut.

Elevator 14 will act to convey the hay to upper and lower feed rollers 20 and 21. Upper feed roller 20 is preferably made of rubber and mounted on a driving shaft 22. Roller 21 is preferably made of steel and mounted on a driving shaft 19. Shafts 19 and 22 are rotatably mounted on the side walls of member B. Roller 21 is somewhat roughened on its periphery (not shown) so as to assist the hay between the rollers and in moving the hay toward the cylinder which in its entirety is designated by reference character G.

In Figure 3 I have indicated by arrows 13 the direction of movement of elevator 14 and rollers 20 and 21 and the direction of rotation of member G is also indicated by arrow 33.

Member G comprises three spaced discs 18 which are rigidly mounted on a driving shaft 23 (see Figures 3 and 4) having secured to their peripheries spiral cutting blades 24. An angle bar 25 is mounted as illustrated in Figure 3 directly in rear of roller 21, the top being slightly below the horizontal plane of the top of this roller. A blade bar 26 is secured to the rear face of member 25 and in position so blades 24 practically contact the upper rear corner of this bar, thus when cylinder G is in the position shown in Figure 3, the hay will be fed over the top of member 25 toward the cylinder by rollers 20 and 21 and blades 24 will chop the hay in short lengths, depending upon the speed of travel of the hay or the speed of the cylinder.

As the hay is chopped by cylinder G, it will fall on a guide plate 27 which is arranged to deliver the hay to member C. Member C is provided with an apron conveyor, the apron being designated by numeral 28 (see Figure 4) having mounted on its outer surface spaced transverse slats 29, the apron traveling in the direction indicated by arrow 48 in Figures 3, 4, 8 and 9.

Figure 4:
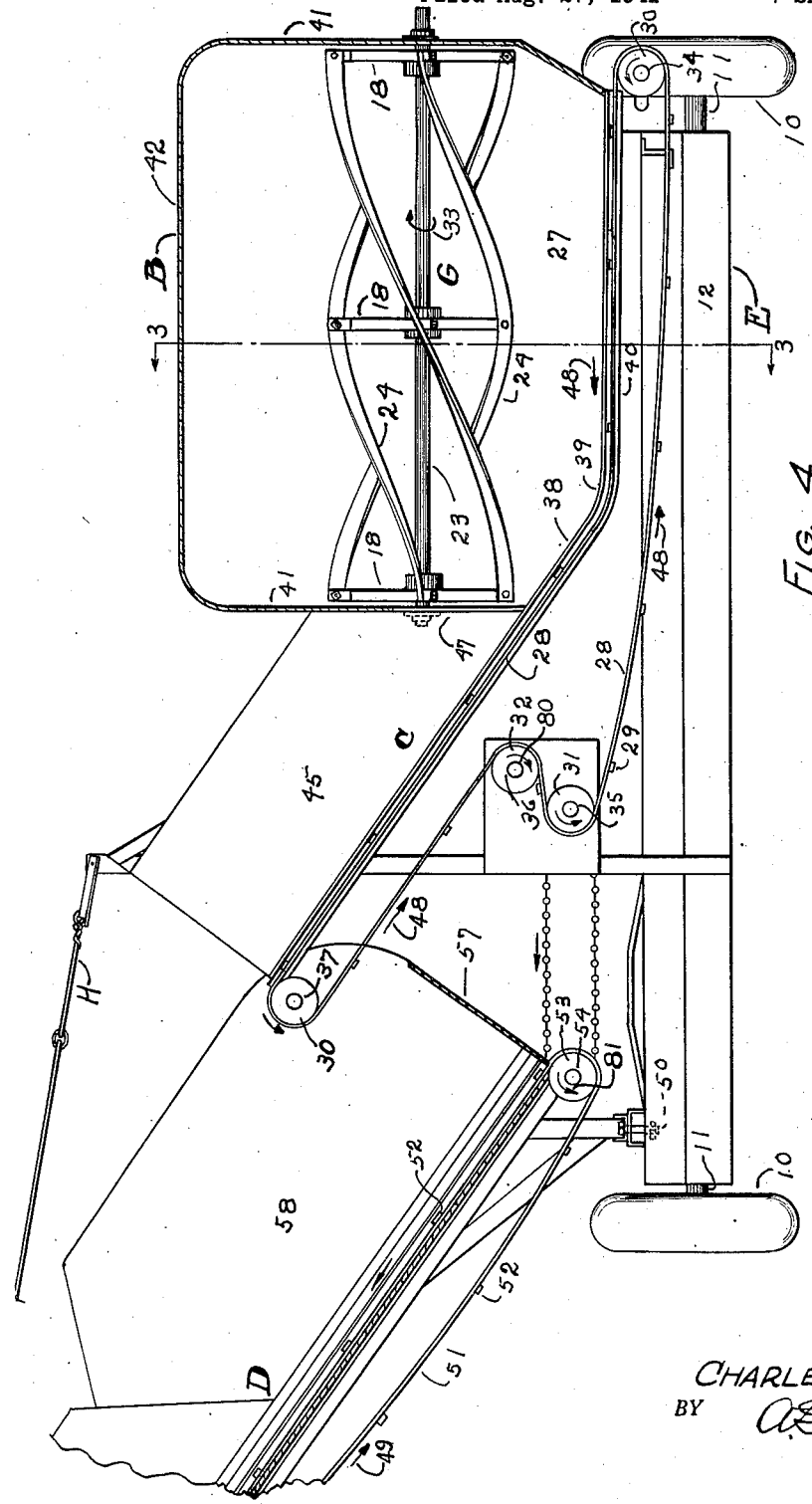
Fig. 4 is a transverse semi-diagrammatic section of the device taken one line 4—4 of Figure 3.

Apron 28 is preferably mounted at each side on driving chains 17 (see Figures 8 and 9) which travel around sprockets 30—30, 31 and 32 (see Figure 4). These sprockets are secured to rotatably mounted shafts 34, 35, 36 and 37. Shafts 35, 36 and 37 are positioned as indicated in Figure 4 so as to provide sufficient room for the lower end of elevator D.

The upper portion of member 28 is held in the position shown in Figures 3 and 4 by means of channel bars 38—38. The inwardly extending upper flanges 39 of bar 38 extend over the ends of slats 29 (see Figure 3) and the canvas and slats rest on the lower inwardly extending flange 40 of channel 38 (see Figure 4). Thus the hay delivered to the transverse elevator will be moved transversely and upwardly and delivered to elevator D (see Figure 4). Sprockets 30, 31 and 32 are positioned so as to provide plenty of room for turning elevator D transversely or rearwardly.

Member B is provided with side plates 41—41 and a cover panel 42, the cover panel being curved forwardly and downwardly terminating as at 43, the rear end of this cover plate being curved rearwardly and downwardly and then extending forwardly and downwardly terminating as at 44 (see Figure 3).

Member 27 and the lower rear end of member 42 are positioned above conveyor belt 28 so as to prevent the hay from escaping forwardly or rearwardly from this conveyor.

The upwardly extending end of member C is provided with front and rear plates 45—45 and a top plate 46. Thus the hay will be retained and delivered to the final elevator D through an opening 47 cut in member 41 (see Figures 3 and 4). Final elevator D is mounted at its inner end on frame E by means of a vertical pivot 50 so the elevator may be turned to the positions shown in Figures 1 and 2. The elevator is provided with suitable framework and a canvas apron 51 having spaced slats 52, the canvas turning in the direction indicated by arrow 49 in Figures 2 and 4, the lower end of the elevator being driven and supported by a roller 53 having a driving shaft 54. The upper end of the elevator is supported on a similar roller (not shown) as is the custom in elevators of the kind.

Elevator D is provided with upper side plates 55—55 having a suitably curved outlet as at 56 so the hay delivered by the elevator will be directed downwardly. The elevator is provided with a lower end panel 57 (see Figures 1 and 4) which prevents the hay from escaping inwardly from the elevator.

Figure 2:
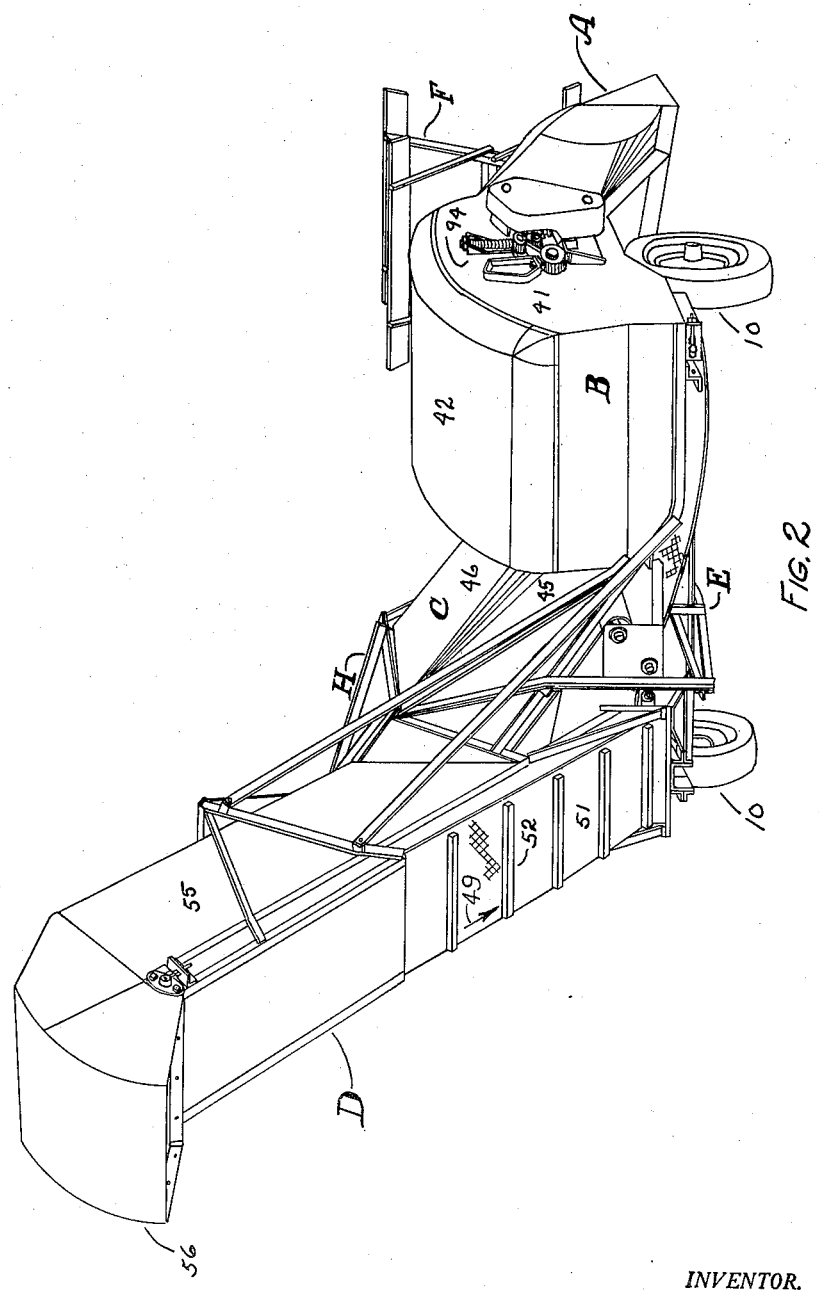
Fig. 2 is a view similar to Figure 1 with the elevating device positioned parallel to the direction of travel.

Relatively high lower side panels 58—58 are provided on elevator D, the near panel being removably attached (not shown) so the elevator may be turned rearwardly without interfering with member C (see Figure 2).

I provide means, as indicated, for supporting the free end of member D by means of bars and brackets which are in their entireties designated by reference character H, the inner end being connected to the upper corner of member C.

In general, I have described my improved hay harvester. I will now point out the various other elements on the harvester in detail.

By referring to Figure 7 it will be noted that I mount a gear housing 65 on frame E having a forwardly extending shaft (not shown) with the necessary appurtenances for connection to the power take-off shaft of a tractor. This device is too well known to require illustration and description. This gear housing is provided with a rearward projection 66 through which a shaft 64 protrudes and having mounted on its protruding end a sprocket 67.

Shaft 36 extends forwardly through suitable bearings and terminates as at 68 having mounted thereon a sprocket 69. A bearing bracket 70 is suitably mounted on the frame work of the device having a shaft 71 rotatably mounted therein, both ends protruding, its rear end carrying a sprocket 72, the front end having a universal joint 73 secured to the rear end of a shaft 74 which extends forwardly and is suitably operatively connected at its front end to reel F.

A chain 75 forms an operating connection between sprockets 67, 69 and 72, thus shafts 36 and 74 will turn in the direction indicated by arrow 82 in Figures 4 and 7 and in turn operate transverse elevator apron 28.

Shaft 35 is provided with a sprocket 76 (see Figure 9). Shafts 35 and 36 are operatively connected together by means of chains 17 (see Figures 4, 7, 8 and 9). A sprocket 77 is secured to the forward end of shaft 54, thus shaft 54 will be turned in the direction shown by arrow 81 in Figure 4. The operating connection between shafts 35 and 54 is made by means of a chain 78 having an idler sprocket 63. Thus, the elevator canvas 51 will be driven in the direction indicated by arrow 49 in Figure 4.

Elevator D in Figures 7 and 8 is shown in a transverse position and the power connections just described are suitable for this position.

Referring now to Figure 8. The rear end of shaft 54 is provided with a bevel pinion 79. A shaft 85 is rotatably mounted on the lower rear corner of member D by means of a suitable bracket 86 having mounted on its inner end a sprocket 87 and a bevel gear 84 on its forward end which meshes bevel gear 79. When elevator D is turned rearwardly on its pivot 50, as illustrated in Figures 2 and 9, sprocket 87 is in line with sprocket 76 and a somewhat shorter chain 88 than chain 78 is used for making an operating connection to sprocket 76. Thus it will be seen that canvas elevator 51 will be driven in the direction shown by arrow 49 in Figure 4 when the elevator is in either position.

Thus it will be seen that the elevator and reel will be driven indirectly by shaft 64. Gear housing 65 is provided with an inwardly extending extension 90 having a shaft which is suitably driven by the gears in the housing and protrudes through extension 90 and having secured to its protruding end a sheave pulley 91.

Shaft 23 has mounted on its left hand end a sheave pulley 92. Sheave pulleys 91 and 92 are, on their inner surfaces, cone shaped suitable for contact with their sides of a V-belt 93. When cylinder G is raised slightly so the hay will be shredded, the cones may be adjusted to provide for the difference in space between the sheaves.

Feed roller 20 is spring held in its lowest position by means indicated in their entirety by reference numeral 94 as is the custom in feed rollers on ensilage cutters and the like. Shaft 23 of member G is rotatably mounted on forwardly extending brackets 95—95 as at 96, the brackets being pivotally mounted on members 41 as at 97 (see Figure 5).

Figure 5:
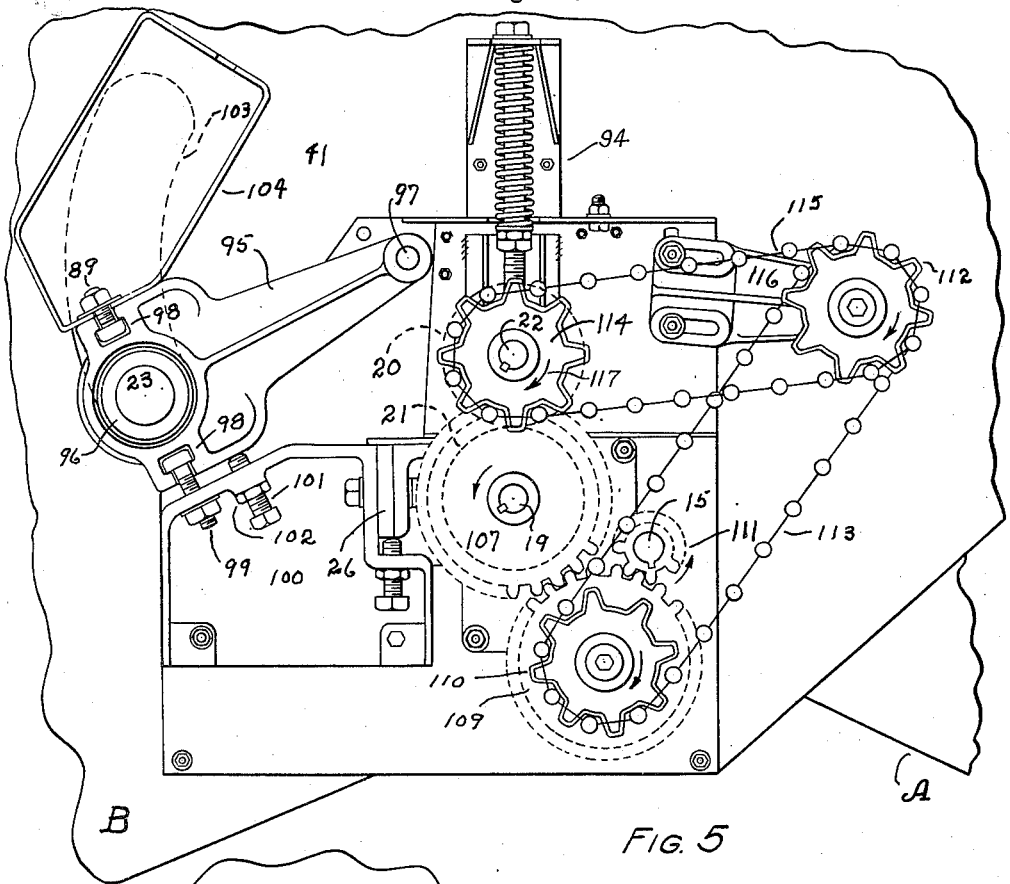
Fig. 5 is an enlarged plan view of a fraction of the device illustrating one of the cylinder supporting brackets and the mechanism for driving the platform elevator and the feed rolls as viewed from the right side of Figure 1 with the gear housing removed.

The rear ends of brackets 95 are preferably provided with slotted openings 98—98 for the reception of bolts 99, the bolts extending through an aperture in a bracket 100 (see Figure 5). Set screws 101 are screw threaded in bracket 100 having a lock nut 102. These set screws on their upper ends form rests for the rear end of bracket 95 and act to positively adjust the space between knives 24 and plate 26. When the proper adjustment is made, bolts 99 are made taut and the cylinder is firmly held in its operating position.

It will be seen that by removing bolts 99, cylinder G may be lifted to its highest position, there being slots 103 in members 41 for accommodating shaft 23 when in this position. A bracket 104 is secured to the upper rear sides of members 95 by two other bolts 89 as indicated in Figure 5 so as to cover slots 103.

Figure 6:
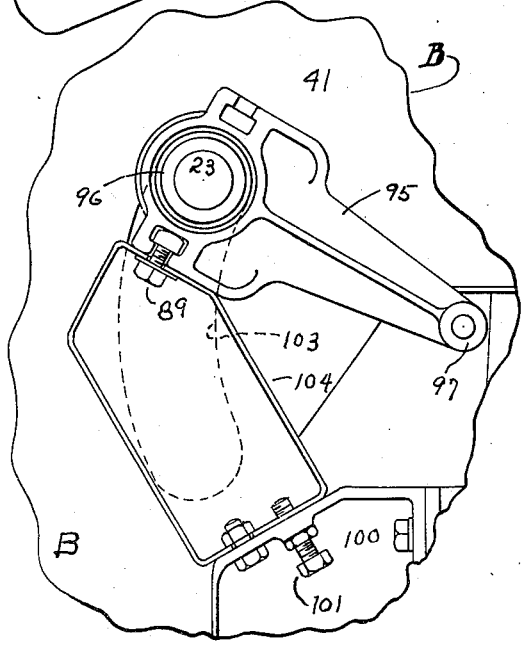
Fig. 6 is an enlarged fractional view of the main housing with the cylinder supporting bracket in its highest position as viewed from the right side of Figure 1.

When it is desired to lift cylinder G to its highest position and hold it in this position, bracket 104 is secured to arm 95 and member 100, as illustrated in Figure 6. Thus it will be seen that by the use of two brackets 104, the cylinder may be moved to either its operating or inoperating position without changing the adjustment of bolts 101.

Bolts 101 and 99 are suitably adapted for very close adjustment of the position of the cylinder relative to bar 26.

When the cylinder is in its highest position (see Figure 6) the hay will be delivered to the elevator in its natural state.

At times it is not desired to chop the hay but it is desired that the hay be somewhat crushed or shredded. In this event, bolts 99 and 101 are used for positioning cylinder blades 24 a slight distance away from plate 26. That is, far enough away so the hay is not chopped but will be more or less crushed, broken and shredded.

It will be seen by the foregoing that my device is applicable to any one of the known means for cutting and handling hay and that the changes necessary for handling the hay, as recited in the preamble of this specification, are very simple and easily made.

Shaft 15 has mounted on its left end a sprocket 105 (see Figure 7). An idler sprocket (not shown) is mounted somewhat below the end of the shaft which carries sheave 91 and slightly forward. A chain 106 forms an operating connection between these shafts so shaft 15 is driven in the direction indicated by arrow 108. Shafts 19 and 22 are driven as follows:

The right hand end of shaft 19 is provided with a gear 107. A rotatably mounted gear 109 which meshes with gear 107 is provided and has secured thereto a sprocket 110. A pinion 111 is secured to shaft 15 and meshes the teeth in gear 109, thus the elevator canvas and shaft 19 are driven.

A pair of idler sprockets 112 (one not shown) is rotatably mounted on bracket 116. One of the sprockets 112 is operatively connected to sprocket 110 by means of a chain 113. On the right hand end of shaft 22, (see Figure 5) I mount a sprocket 114 having a chain 115 forming an operating connection to the other sprocket 112. The sprockets of this pair are suitably secured together. It will be seen that roller 20 will be driven in the direction indicated by arrow 117.

I claim:

1. In a harvesting device of the class described, a wheel supported frame adapted for attachment to the draw bar of a tractor and having a transmission thereon with operating connections to all of the operating parts of the harvesting device, a housing having side panels, a chopping and shredding device in the housing, means for delivering material to the chopping and shredding device, conveying means in rear of said chopping and shredding device adapted to receive and elevate the material after leaving the chopping and shredding device, said chopping and shredding device comprising a pair of rotatably mounted feed rollers, a blade bar and supporting means therefor positioned in rear of said rollers and adapted to receive and support the material fed rearwardly between said rollers, arms pivotally supported at their forward ends on the frame a distance above said blade bar, a cylinder having knives rotatably mounted in the rear ends of said arms, means for adjusting the rear ends of said arms for placing the knives in two different positions relative to the blade bar whereby the material passed over the blade bar may be selectively chopped or shredded, and means for holding the rear ends of the arms and knives remotely positioned relative to the blade bar for the free passage of material over the blade bar to the conveying means.

2. In a harvesting device of the class described, a wheel supported frame adapted for attachment to the draw bar of a tractor and having a transmission thereof with operating connections to all of the operating parts of the harvesting device, a housing having side panels, a chopping and shredding device in the housing, means for delivering material to the chopping and shredding device, conveying means in rear of said chopping and shredding device adapted to receive and elevate the material after leaving the chopping and shredding device, said chopping and shredding device comprising a pair of rotatably mounted feed rollers, a blade bar and supporting means therefor positioned in rear of said rollers and adapted to receive and support the material fed rearwardly between said rollers, arms pivotally supported at their forward ends on the frame a distance above said blade bar, a cylinder having knives rotatably mounted in the rear ends of said arms, brackets on the frame below the arms, means on the brackets for adjusting the rear ends of said arms for placing the knives in two different positions relative to the blade bar whereby the material passed over the blade bar may be selectively chopped or shredded, means for holding the arms in adjusted positions relative to the brackets, and means for holding the rear ends of the arms and knives remotely positioned relative to the blade bar for the free passage of the material over the blade bar to the conveying means.

3. A harvesting device as set forth in claim 1, wherein the last named means comprises an opening in each panel of the housing adapted to permit said adjustment of the cylinder exteriorly of the housing, plates adapted to be removably secured to the upper sides of the rear ends of said arms for covering said openings when the arms are in their chopping and shredding positions, and said plates adapted to be positioned below said arms to act as supports for the arms and cover the lower ends of said openings when the arms are moved to their highest positions.

4. In a harvesting device of the class described, a wheel supported frame adapted for attachment to the draw bar of a tractor and having a transmission thereon with operating connections to all of the operating parts of the harvesting device, a housing having side panels, a chopping and shredding device in the housing, means for delivering material to the chopping and shredding device, conveying means in rear of said chopping and shredding device adapted to receive and elevate the material after leaving the chopping and shredding device, said chopping and shredding device comprising a pair of rotatably mounted feed rollers, a blade bar and supporting means therefor positioned in rear of said rollers and adapted to receive and support the material fed rearwardly between said rollers, arms pivotally supported at their forward ends on the frame a distance above said blade bar, a cylinder having knives rotatably mounted in the rear ends of said arms, brackets on the frame below the arms, threaded members in the brackets engageable with the free ends of the arms to provide supports therefor and for shifting said arms whereby the cylinder knives may be adjusted to chop or shred the material fed over the blade bars, and a nut and bolt connection between the brackets and free ends of the arms for holding the latter in adjusted position.

5. In a harvesting device of the class described, a wheel supported frame adapted for attachment to the draw bar of a tractor and having a transmission thereon with operating connections to all of the operating parts of the harvesting device, a housing having side panels, a chopping and shredding device in the housing, means for delivering material to the chopping and shredding device, conveying means in rear of said chopping and shredding device adapted to receive and elevate the material after leaving the chopping and shredding device, said chopping and shredding device comprising a pair of rotatably mounted feed rollers, a blade bar and supporting means therefor positioned in rear of said rollers and adapted to receive and support the material fed rearwardly between said rollers, arms pivotally supported at their forward ends on the frame a distance above said blade bar, a cylinder having knives rotatably mounted in the rear ends of said arms, brackets on the frame below the arms, threaded members mounted in the brackets engageable with the free ends of the arms to provide supports therefor and for shifting said arms whereby the cylinder knives may be adjusted to chop or shred the material fed over the blade bars, a nut and bolt connection between the brackets and free ends of the arms for holding the latter in adjusted position, and a spacer element adapted to be interposed between the brackets and the free ends of said arms whereby the rear free ends of said arms may be swung vertically thereby to hold said cylinder in a position substantially to clear the material fed over the blade bar.

CHARLES E. EVERETT.